(12) United States Patent
Qiu

(10) Patent No.: US 12,470,382 B2
(45) Date of Patent: Nov. 11, 2025

(54) DIGITAL KEY PAIRING METHOD, PAIRING SYSTEM, AND VEHICLE

(71) Applicant: Huizhou DESAY SV Intelligent Transportation Technological Institute Co., LTD., Huizhou (CN)

(72) Inventor: Xiaobo Qiu, Huizhou (CN)

(73) Assignee: Huizhou DESAY SV Intelligent Transportation Technological Institute Co., LTD., Huizhou (CN)

( * ) Notice: Subject to any disclaimer, the term of this patent is extended or adjusted under 35 U.S.C. 154(b) by 126 days.

(21) Appl. No.: 18/215,780

(22) Filed: Jun. 28, 2023

(65) Prior Publication Data
US 2024/0073020 A1    Feb. 29, 2024

(30) Foreign Application Priority Data
Aug. 26, 2022    (CN) .......................... 202211031499.3

(51) Int. Cl.
| | |
|---|---|
| H04L 9/30 | (2006.01) |
| H04L 9/06 | (2006.01) |
| H04L 9/08 | (2006.01) |
| H04L 9/14 | (2006.01) |
| H04L 9/32 | (2006.01) |

(52) U.S. Cl.
CPC .......... H04L 9/3073 (2013.01); H04L 9/0631 (2013.01); H04L 9/0861 (2013.01); H04L 9/14 (2013.01); H04L 9/321 (2013.01)

(58) Field of Classification Search
CPC ... H04L 9/3073; H04L 9/0631; H04L 9/0861; H04L 9/14; H04L 9/321; B60R 25/248
See application file for complete search history.

(56) References Cited

U.S. PATENT DOCUMENTS

| | | | |
|---|---|---|---|
| 8,918,643 | B2 | 12/2014 | Okude |
| 9,189,900 | B1 * | 11/2015 | Penilla .................... B60L 53/80 |

(Continued)

FOREIGN PATENT DOCUMENTS

| | | |
|---|---|---|
| CN | 101855861 A | 10/2010 |
| CN | 103905903 B | 2/2016 |

(Continued)

OTHER PUBLICATIONS

SIPO, Search Report and First Notice of Review Opinion, App. No. 202211031499.3.

Primary Examiner — John B King
(74) Attorney, Agent, or Firm — Hemisphere Law, PLLC; Zhigang Ma

(57) ABSTRACT

A digital key pairing method includes: initiating a pairing requirement to a digital key master module by means of a security management center in an in-vehicle infotainment system; after the security management center obtains a first digital secret key generated by the digital key master module, converting the first digital secret key into an identifiable image; reading the identifiable image by a digital key to obtain a second digital secret key, and decrypting the second digital secret key; and initiating, by the digital key, a verification requirement to the digital key master module based on the decrypted second digital secret key. The digital key pairing method achieves safe Bluetooth out-of-band pairing, and is high in security level, capable of achieving rapid pairing, and good in user experience.

15 Claims, 2 Drawing Sheets

(56) References Cited

U.S. PATENT DOCUMENTS

| | | | |
|---|---|---|---|
| 9,800,925 B2 | 10/2017 | Xu et al. | |
| 10,182,255 B2 | 1/2019 | Xu et al. | |
| 10,924,924 B1 | 2/2021 | Hassani et al. | |
| 2004/0203384 A1* | 10/2004 | Sugikawa | H04W 12/50 |
| | | | 455/411 |
| 2006/0088166 A1* | 4/2006 | Karusawa | H04L 9/3273 |
| | | | 380/277 |
| 2010/0241857 A1* | 9/2010 | Okude | H04L 9/08 |
| | | | 713/168 |
| 2014/0025951 A1* | 1/2014 | Ho | H04L 9/3268 |
| | | | 713/168 |
| 2015/0222517 A1* | 8/2015 | McLaughlin | H04W 4/70 |
| | | | 713/171 |
| 2016/0285839 A1* | 9/2016 | Kunihiro | H04L 9/321 |
| 2021/0209614 A1* | 7/2021 | Bakalis | G06Q 10/0833 |
| 2022/0204121 A1* | 6/2022 | Ericksen | B62K 25/04 |
| 2022/0210650 A1* | 6/2022 | Ericksen | H04W 4/80 |
| 2022/0266939 A1* | 8/2022 | Ericksen | B62J 45/4151 |
| 2022/0286862 A1* | 9/2022 | Layouni | H04W 12/041 |

FOREIGN PATENT DOCUMENTS

| | | | | |
|---|---|---|---|---|
| CN | 106156641 A | | 11/2016 | |
| CN | 111200496 A | | 5/2020 | |
| CN | 114821867 A | | 7/2022 | |
| CN | 115303227 A | | 11/2022 | |
| EP | 3104658 B1 | * | 3/2019 | H04Q 9/00 |
| EP | 3320665 B1 | * | 4/2021 | G06F 21/44 |
| WO | 2009063947 A1 | | 5/2009 | |
| WO | 2014101578 A1 | | 7/2014 | |

* cited by examiner

DIGITAL KEY PAIRING METHOD, PAIRING SYSTEM, AND VEHICLE

CROSS-REFERENCE TO RELATED APPLICATION

The present application claims priority of China Patent Application No. 202211031499.3, filed on Aug. 26, 2022, the contents of which are incorporated herein by reference.

BACKGROUND OF THE INVENTION

1. Technical Field

The present invention relates to intelligent driving, in particular to a digital key pairing method, a pairing system, a digital key, and a vehicle.

2. Description of Related Art

An existing digital key system for a vehicle mainly performs communication by using a Bluetooth technology, and if a smartphone or a wearable device serving as the most commonly used key end wants to safely communicate with the vehicle end by using a Bluetooth wireless communication technology, safe pairing is required.

A Bluetooth protocol specification provides four pairing ways: 1. Numeric Comparison: a 6-digit number is displayed by each of both pairing sides, it is checked by a user whether the numbers are consistent, and if the numbers are consistent, pairing may be performed; 2. Just Works: it is used for pairing devices which have no displays or inputs, pairing may be performed by actively initiating a connection, and the user cannot see a pairing process; 3. Passkey Entry: a pairing target is required to input a 6-digit number displayed on a local device, and pairing may be performed as long as the input is correct; and 4. Out of Band (which is OOB for short and means "out-of-band"): two devices exchange pairing information in other ways.

There are the following technical problems in the prior art: 1. the above-mentioned pairing ways 1, 2, and 3 are in-band pairing modes, have a risk of being attacked, and face some security risks, such as man-in-the-middle attacks and passive monitoring attacks; and 2. the above-mentioned pairing way 4 is an out-of-band pairing mode, developers may define their own pairing mechanisms, and meanwhile, their security levels also depend on the out-of-band matching ways adopted by the developers. However, for the digital key system for the vehicle, if out-of-band pairing is desired, a general solution is to use an NFC, and therefore, each of the vehicle end and a mobile phone end has to be equipped with an NFC module and to be in close contact; or the vehicle end is in wired connection with the key end by using a USB, and thus, the user experience is not good.

BRIEF DESCRIPTION OF THE SEVERAL VIEWS OF THE DRAWINGS

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
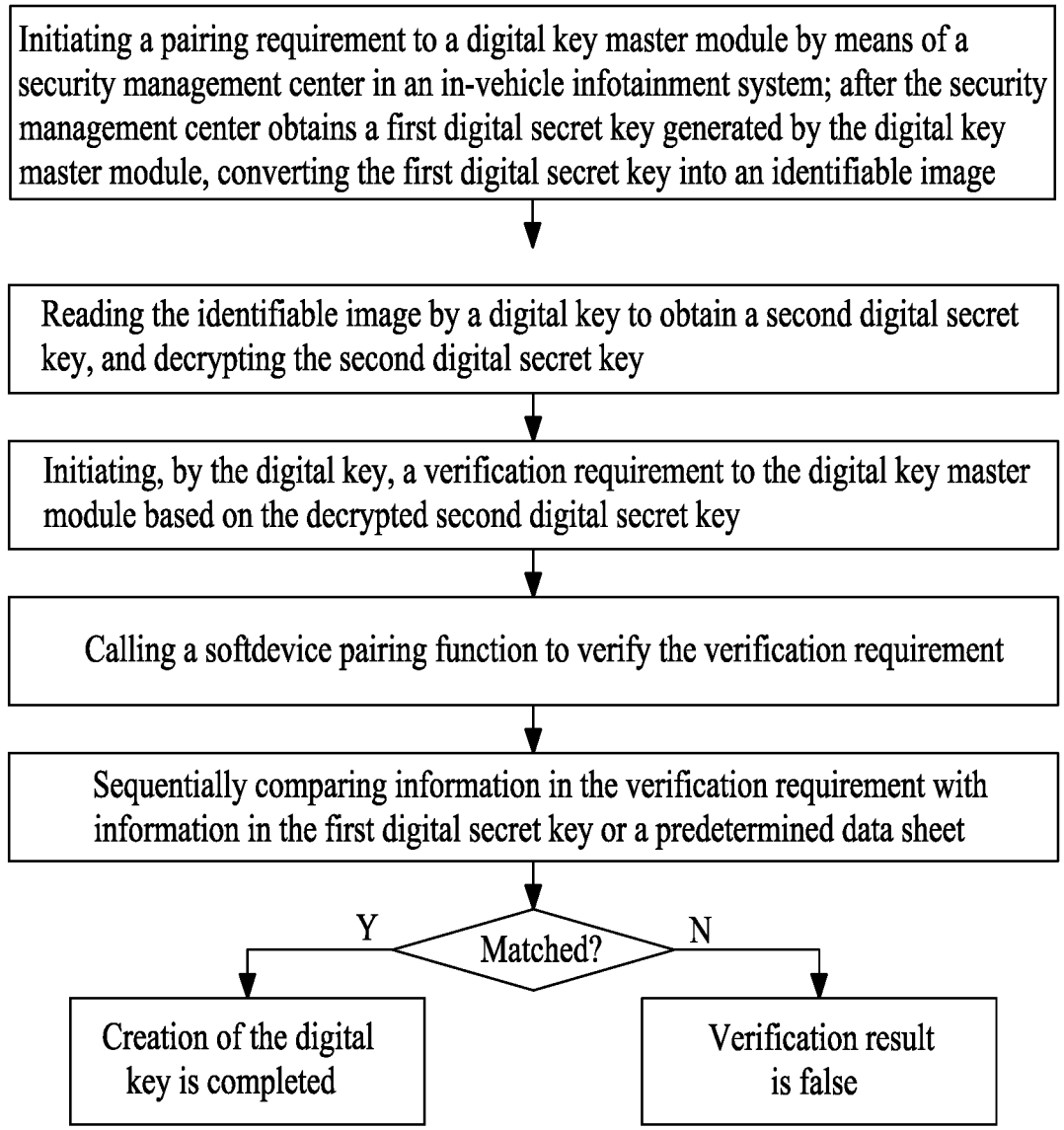
FIG. 1 is a flow diagram of a digital key pairing method in accordance with an embodiment of the present invention.
Figure 2:
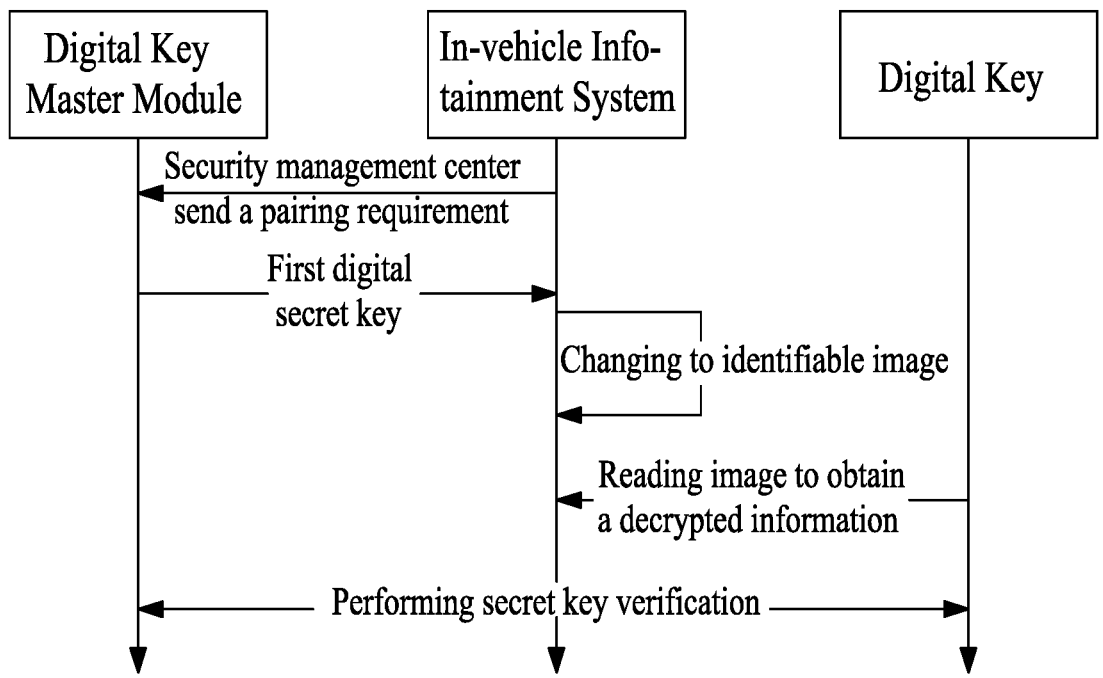
FIG. 2 is a sequence diagram of digital key pairing in accordance with an embodiment of the present invention.
Figure 3:
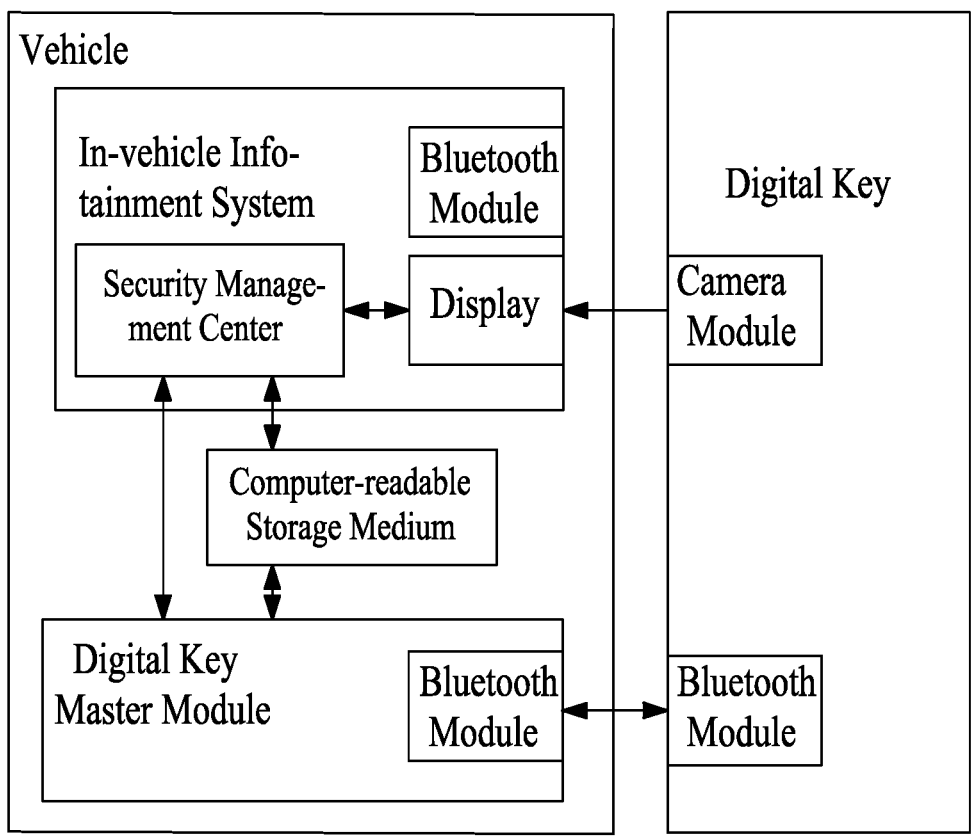
FIG. 3 is a schematic diagram of a digital key pairing system in accordance with an embodiment of the present invention.

Refer to FIG. 1 and FIG. 2, in a preferred embodiment, a digital key pairing method in accordance with the present invention is mainly applied to the field of intelligent driving, such as a system shown in FIG. 3. Specifically, the pairing method mainly includes the following steps.

A security management center of an in-vehicle infotainment system of a vehicle is triggered to generating a pairing requirement and sending the pairing requirement to a digital key master module via a data bus or cable, such as CAN bus or Ethernet cable. The digital key master module is mounted on the vehicle. The security management center may be triggered when a button of the in-vehicle infotainment system is pressed in a predetermined matter, or a pairing request is received via a touch screen of the in-vehicle infotainment system. The pairing requirement may include a true random number, such as a 128-digit true random number generated by the security management center.

The digital key master module generates a first digital secret key in response to the pairing requirement and feeds back the first digital secret key to the security management center. The digital key master module may firstly read the pairing requirement to obtain the information included in the pairing requirement, such as the true random number. Then the digital key master module obtains a Bluetooth address of its own Bluetooth module, and may generate the first digital secret key by serializing the true random number and the Bluetooth address and encrypting the serialized information. That is, the first digital secret key is a encrypted data. The Bluetooth address may be preferably stored in the digital key master module. In the other embodiment, the Bluetooth address may be stored in a computer-readable storage medium of the vehicle.

Once received the first digital secret key, the security management center converts the first digital secret key into an identifiable image and displays the identifiable image on a display, such as the touch screen of the in-vehicle infotainment system. The identifiable image may include a bar code, or a two-dimensional code, or a character string, or a text, or a combination of the above bar code and text, or a combination of the two-dimensional code and text.

A digital key reads the identifiable image to obtain a second digital secret key, and the second digital secret key is decrypted to obtain a decrypted information. Then the digital key generates a verification requirement according to the decrypted information, and sending the verification requirement to the digital key master module via a Bluetooth module of the digital key. The digital key may be any mobile communication device with a camera module and a Bluetooth module, but not limited to a smartphone and a wearable device. Generally speaking, information in the second digital secret key is the same as that in the first digital secret key, and the verification requirement may include the true random number or a verified number corresponding to the true random number included in the first digital secret key. The verification requirement may also include the Bluetooth address. The verification requirement may also include an identification number of the digital key. Information in the verification requirement is preferably encrypted to obtained the verification requirement.

The digital key master module performs a secret key verification and outputs a verification result in response to the verification requirement.

A method for performing the secret key verification may include: a SoftDevice pairing function is called to verify the verification requirement, and the information included in the verification requirement is checked according to the first digital secret key. Information, such as a Bluetooth address and a random temporary secret key or the verified number corresponding to the true random number in the verification requirement are sequentially compared with a Bluetooth address and a random temporary secret key in the first digital secret key or a predetermined data sheet, and when the information is matched, the verification result is true, and the creation of the digital key is completed; or else, the verification result is false, the digital key cannot communicate with the vehicle via the digital key master module, the digital key master module may let the security management center outputs a false information via the display.

The digital key pairing process of the present invention involves three independent devices: the digital key master module, the in-vehicle infotainment system with a security management center, and a mobile terminal as a digital key. In general, the in-vehicle infotainment system also has a Bluetooth module, but the pairing method of the present invention does not use the Bluetooth module of the in-vehicle infotainment system to pair with the digital key. The digital key master module and the in-vehicle infotainment system of the present invention are independent of each other and communicate only through the vehicle's data bus or cable, just like two computers in the local area network communicate through Ethernet. The pairing method of the present invention uses the Bluetooth module of the digital key master module to pair with the digital key. The purpose of the present invention is to illustrate how to safely pair with the display screen of a third-party independent device. For the digital key master module and the digital key, the in-vehicle infotainment system is a third-party device with security risks, so the secret information needed by the digital key master module to generate pairing is encrypted and sent to the in-vehicle infotainment system, so the pairing information obtained by the infotainment system is ciphertext. Even if the infotainment system is maliciously attacked to steal the matched ciphertext information, there is no need to worry about security. At the same time, the identifiable image displayed on the display of the entertainment system, even if a third party scans with other mobile terminals, the third party can only obtain the ciphertext, but cannot decrypt it, so there is no need to worry about information leakage. Therefore, the digital key matching method of the present invention is very safe and reliable.

The identifiable image, used in a pairing process is presented by means of the security management center in the in-vehicle infotainment system, and pairing information is identified by a camera of the digital key so that the exchange of the pairing information is achieved. In this process, a Bluetooth out-of-band pairing way other than an NFC and a USB is provided, a vehicle and a mobile phone which are not provided with NFC modules can also achieve rapid Bluetooth out-of-band pairing, and therefore, high practicability and wide applicability are achieved.

The step that information in the verification requirement is sequentially compared with information in the first digital secret key or the predetermined data sheet is a key step of Bluetooth out-of-band pairing, and can avoid man-in-the-middle attacks and passive monitoring attacks and ensure pairing security.

In the present embodiment, the step that the first digital secret key is generated by the digital key master module specifically includes: a Legacy paring protocol is defined by a security management layer of a Bluetooth protocol stack, a secret key generation way specified in the Legacy paring protocol at least including: a Bluetooth address and a random temporary secret key; and when the digital key master module receives a request for acquiring pairing information, a data is generated based on the Legacy paring protocol, and is encrypted to obtain the first digital secret key.

During specific implementation, the secret key generation way is formed based on the self-definition of a developer so that the security level is greatly improved. The Bluetooth address may be a variable Bluetooth MAC address, and the random temporary secret key may be a 128-digit true random number generated by the security management center. By using the secret key generation way including the Bluetooth address and the random temporary secret key, the pairing security level is improved; and after encryption, the security level is further improved.

In the present embodiment, the digital key pairing method further includes: the digital key master module copies the first digital secret key, and the extra copy of the first digital secret key is used in the secret key verification. The digital key master module copies the first digital secret key, which ensures that the subsequent pairing process can be verified, and is a key of a Bluetooth pairing identity.

In the present embodiment, the digital key pairing method further includes: the first digital secret key and the second digital secret key are encrypted and decrypted by an AES-CCM (Advanced Encryption Standard-CCM) encipher. The AES-CCM is a relatively commonly used encryption algorithm in a wireless communication system, relatively high in both efficiency and security standards, and capable of achieving information encryption in a Bluetooth out-of-band pairing process and improving the pairing security level.

FIG. 2 to FIG. 3 illustrate a flow chat and functional modules diagram of a pairing system adopting the digital key pairing method.

As described above, the pairing system mainly includes the digital key master module and the security management center of the in-vehicle infotainment system. The digital key master module has a Bluetooth module and is used to acquire a pairing information instruction from a request sent from the security management center, generate a secret key based on a preset Legacy paring protocol, and encrypt the secret key to obtain a first digital secret key to be sent to the security management center. The security management center is used to convert the first digital secret key into an identifiable image.

A digital key matched with the digital key master module is used to read the identifiable image to obtain a second digital secret key, and initiate digital secret key verification to the digital key master module based on the second digital secret key. The digital key includes a camera module and a Bluetooth module.

In the present embodiment, the digital key master module is mounted on a vehicle. A Legacy paring protocol and a SoftDevice pairing function are stored in the digital key master module and are defined by a security management layer of a Bluetooth protocol stack. The digital key master module generates the first digital secret key according to the Legacy paring protocol; the SoftDevice pairing function is configured for verifying the second digital secret key.

A secret key generation way specified in the Legacy paring protocol at least includes a Bluetooth address and a random temporary secret key.

As another preference, the present invention further provides a digital key which is one of digital keys for vehicles. The digital key is any one mobile communication device with a camera. The digital key is capable of reading an identifiable image to implement the above-mentioned digital key pairing method.

As another preference, the present invention further provides a vehicle. The vehicle includes an in-vehicle infotainment system, a digital key master module, and a computer-readable storage medium.

The in-vehicle infotainment system includes a display (may be has a touchscreen) and a security management center. The security management center is wired with the digital key master module and the computer-readable storage medium by data bus or cable, such as CAN bus or Ethernet cable.

The security management center is used for initiating a pairing requirement, and converting a received digital secret key into an identifiable image and controlling the display to display the identifiable image. The digital key master module is used for generating a first digital secret key in response to the pairing requirement and feeding back the first digital secret key, and performing a secret key verification and outputting a verification result in response to a verification requirement received via its own Bluetooth module. The computer-readable storage medium is used for storing therein a Legacy paring protocol and a SoftDevice pairing function. The digital key master module generates the first digital secret key according to the Legacy paring protocol. The SoftDevice pairing function is configured for verifying information included in the verification requirement. The digital key includes a camera module and a Bluetooth module and is capable of reading the identifiable image to obtain the second digital secret key, generating the verification requirement according to the second digital secret key, and sending the verification requirement wirelessly to the digital key master module via the Bluetooth module. The Legacy paring protocol is defined according to a security management layer of a Bluetooth protocol stack. A digital secret key generation way specified in the Legacy paring protocol at least includes a Bluetooth address and a random temporary secret key.

The computer-readable storage medium is further used for storing a computer program. The computer program may be controlled and executed by one or more processors (such as the digital key master module and the security management center) to implement the above-mentioned digital key pairing method. For example, the digital key master module executes the computer program when receiving the pairing requirement to generate and send out the first digital secret key and to perform the secret key verification and output the verification result in response to the verification requirement. A method for performing the secret key verification may include: calling the SoftDevice pairing function to verify the verification requirement; and sequentially comparing information in the verification requirement with the Bluetooth address and the random temporary secret key in the first digital secret key, and when the information is matched, the verification result is true, or else, the verification result is false.

Compared with the prior art, the present invention has the beneficial effects that: by mounting the digital key master module on a vehicle end, the digital key master module is in communication connection with the in-vehicle infotainment system, encrypted information, i.e., the identifiable image, used in a pairing process is presented by means of the security management center in the in-vehicle infotainment system, and pairing information is identified by a camera of the digital key so that the exchange of the pairing information is safely achieved. A Bluetooth out-of-band pairing way other than an NFC and a USB is provided, a vehicle end and a mobile phone end which are not provided with NFC modules can also achieve rapid Bluetooth out-of-band pairing, and therefore, high practicability and wide applicability are achieved.

Those of ordinary skill in the art may realize that the units and algorithm steps in all examples described in conjunction with the embodiments disclosed in the present invention may be implemented by electronic hardware or a combination of computer software and the electronic hardware. Whether these functions are implemented by hardware or software depends upon specific applications and design constraints of the technical solutions. The skilled in the art may adopt different methods to achieve the described functions in each specific application, which, however, should be considered as falling within the scope of the present invention.

Each system or method embodiment of the present invention may be implemented by hardware or a software module running on one or more processors or a combination thereof. It should be understood by the skilled in the art that some or parts of functions of some modules according to the embodiments of the present invention may be implemented in practice by using a microprocessor or a digital signal processor (DSP). The present invention may also be implemented as a part or all of apparatus programs (such as a computer program and a computer program product) for performing the method described herein. Such a program for implementing the present invention may be stored in a computer-readable storage medium or may have one or more signal forms. Such a signal may be downloaded from an Internet website or provided on a carrier signal or any other forms.

In several embodiments provided by the present application, it should be understood that the disclosed system and method may be implemented in other ways. For example, the system embodiment described above is only schematic. For example, the function division is only logic function division, there may be other division ways during actual implementation, for example, a plurality of tools or assemblies may be combined or integrated into another system, or some features may be ignored or not be performed.

In addition, terms such as "first" and "second" are for descriptive purposes only, and cannot be understood as indicating or implying the relative importance or implicitly indicating the number of indicated technical features. Therefore, the features defined as "first" and "second" may explicitly or implicitly include one or more of the features. In the description of the present invention, the meaning of "a plurality of" may be two or more unless it may be specifically defined otherwise.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A digital key pairing method, comprising:
generating, by a security management center of an in-vehicle infotainment system of a vehicle, a pairing requirement;
sending, by the security management center, the pairing requirement to a digital key master module through a wired connection, wherein the in-vehicle infotainment system comprises a first Bluetooth module and a display, and wherein the pairing requirement comprises a true random number;
generating, by the digital key master module, an encrypted first digital secret key according to the pairing requirement;
sending, by the digital key master module, the encrypted first digital secret key to the security management center, wherein the digital key master module comprises a second Bluetooth module and wherein the encrypted first digital secret key comprises a Bluetooth address of the second Bluetooth module and the true random number;
converting, by the security management center, the encrypted first digital secret key into an identifiable image and displaying the identifiable image on the display of the in-vehicle infotainment system;
scanning, by a digital key device, the identifiable image using a camera;
retrieving, by the digital key device, a second digital secret key from the identifiable image;
generating, by the digital key device, a verification requirement using the second digital secret key;
outputting, by the digital key device, the verification requirement wirelessly via a third Bluetooth module to the digital key master module; and
performing, by the digital key master module, a Bluetooth pairing with the digital key device after receiving the verification requirement;
wherein the Bluetooth pairing comprises:
calling a SoftDevice pairing function to verify the verification requirement;
comparing the encrypted first digital secret key with the encrypted second digital secret key of the verification requirement, and
when the encrypted first digital secret key matches the encrypted second digital secret key a pairing result is true and the digital key device and the digital key master module are successfully paired, or when the encrypted first digital secret key and the encrypted second digital secret key do not match the pairing result is false and the digital key device and the digital key master module are not successfully paired.

2. The digital key pairing method according to claim 1, wherein the encrypted first digital secret key is generated based on a Legacy paring protocol, the Legacy paring protocol is defined according to a security management layer of a Bluetooth protocol stack.

3. The digital key pairing method according to claim 1, further comprising: making at least one extra copy of the encrypted first digital secret key; wherein the at least one extra copy of the encrypted first digital secret key is used in the Bluetooth pairing.

4. The digital key pairing method according to claim 1, wherein the identifiable image at least comprises any one of a bar code, a two-dimensional code, a character string, and a text.

5. The digital key pairing method according to claim 1, wherein the encrypted first digital secret key and the second digital secret key are encrypted signals and decrypted by an AES-CCM encipher.

6. The digital key pairing method according to claim 1, after the performing the Bluetooth pairing, further comprising:
outputting the pairing result to the security management center; and
the security management center displaying the pairing result on the display.

7. A digital key pairing system, comprising:
a security management center of an in-vehicle infotainment system of a vehicle, the in-vehicle infotainment system comprising a first Bluetooth module and a display;
a digital key master module, comprising a second Bluetooth module; and
a digital key device, comprising a third Bluetooth module and a camera; and
a non-transitory computer-readable storage medium storing therein a Legacy paring protocol and a SoftDevice pairing function that when executed by one or more hardware processors perform operations comprising:
generating, by the security management center, a pairing requirement;
sending, by the security management center, the pairing requirement to the digital key master module through a wired connection, wherein the pairing requirement comprises a true random number;
generating, by the digital key master module, an encrypted first digital secret key according to the pairing requirement;
sending, by the digital key master module, the encrypted first digital secret key to the security management center, wherein the encrypted first digital secret key comprises a Bluetooth address of the second Bluetooth module and the true random number;
converting, by the security management center, the encrypted first digital secret key into an identifiable image and displaying the identifiable image on the display;
scanning, by a digital key device, the identifiable image using a camera;
retrieving, by the digital key device, a second digital secret key from the identifiable image;
generating, by the digital key device, a verification requirement using the second digital secret key;
outputting, by the digital key device, the verification requirement wirelessly via a third Bluetooth module to the digital key master module; and
performing, by the digital key master module, a Bluetooth pairing with the digital key device after receiving the verification requirement;
wherein the Bluetooth pairing comprises:
calling the SoftDevice pairing function to verify the verification requirement;
comparing the encrypted first digital secret key with the encrypted second digital secret key of the verification requirement, and
when the encrypted first digital secret key matches the encrypted second digital secret key a pairing result is true and the digital key device and the digital key master module are successfully paired, or when the encrypted first digital secret key and the encrypted second digital secret key do not match the pairing result is false and the digital key device and the digital key master module are not successfully paired.

8. The digital key pairing system according to claim 7, wherein the digital key master module is mounted on the vehicle, wherein the digital key master module generates the encrypted first digital secret key according to the Legacy paring protocol and performs the Bluetooth pairing according to the SoftDevice pairing function.

9. The digital key pairing system according to claim 8, wherein the Legacy paring protocol is defined according to a security management layer of a Bluetooth protocol stack.

10. The digital key pairing system according to claim 8, wherein the SoftDevice pairing function is defined according to a security management layer of a Bluetooth protocol stack.

11. The digital key pairing system according to claim 7, wherein the digital key master module is further configured for making at least one extra copy of the encrypted first digital secret key; wherein the at least one extra copy of the encrypted first digital secret key is used in the Bluetooth pairing.

12. The digital key pairing system according to claim 7, wherein the encrypted first digital secret key and the second digital secret key are encrypted and decrypted by an AES-CCM encipher.

13. The digital key pairing system according to claim 7, wherein the identifiable image at least comprises any one of a bar code, a two-dimensional code, a character string, and a text.

14. A vehicle, comprising:
an in-vehicle infotainment system, comprising:
a first Bluetooth module;
a display; and
a security management center;
a digital key master module, comprising a second Bluetooth module; and
a non-transitory computer-readable storage medium, configured for storing therein a Legacy paring protocol and a SoftDevice pairing function that when executed by one or more hardware processors perform operations comprising:
generating, by the security management center, a pairing requirement;
sending, by the security management center, the pairing requirement to the digital key master module through a wired connection, wherein the pairing requirement comprises a true random number;
generating, by the digital key master module, an encrypted first digital secret key according to the pairing requirement;
sending, by the digital key master module, the encrypted first digital secret key to the security management center, wherein the encrypted first digital secret key comprises a Bluetooth address of the second Bluetooth module and the true random number;
converting, by the security management center, the encrypted first digital secret key into an identifiable image and displaying the identifiable image on the display;
scanning, by a digital key device, the identifiable image using a camera;
retrieving, by the digital key device, a second digital secret key from the identifiable image;
generating, by the digital key device, a verification requirement using the second digital secret key:
outputting, by the digital key device, the verification requirement wirelessly via a third Bluetooth module to the digital key master module; and
performing, by the digital key master module, a Bluetooth pairing with the digital key device after receiving the verification requirement;
wherein the Bluetooth pairing comprises:
calling the SoftDevice pairing function to verify the verification requirement;
comparing the encrypted first digital secret key with the encrypted second digital secret key of the verification requirement, and
when the encrypted first digital secret key matches the encrypted second digital secret key a pairing result is true and the digital key device and the digital key master module are successfully paired, or when the encrypted first digital secret key and the encrypted second digital secret key do not match the pairing result is false and the digital key device and the digital key master module are not successfully paired.

15. The vehicle according to claim 14, wherein the digital key master module outputs the pairing result on the display in response to the verification requirement.

* * * * *